July 23, 1957  H. G. CONWAY  2,799,992
HYDRAULICALLY ACTUATED LINKAGES
Filed Oct. 20, 1953  2 Sheets-Sheet 1

INVENTOR
Hugh G. Conway
By Watson, Cole, Grindle &
Watson
ATTORNEYS

July 23, 1957  H. G. CONWAY  2,799,992
HYDRAULICALLY ACTUATED LINKAGES
Filed Oct. 20, 1953  2 Sheets-Sheet 2
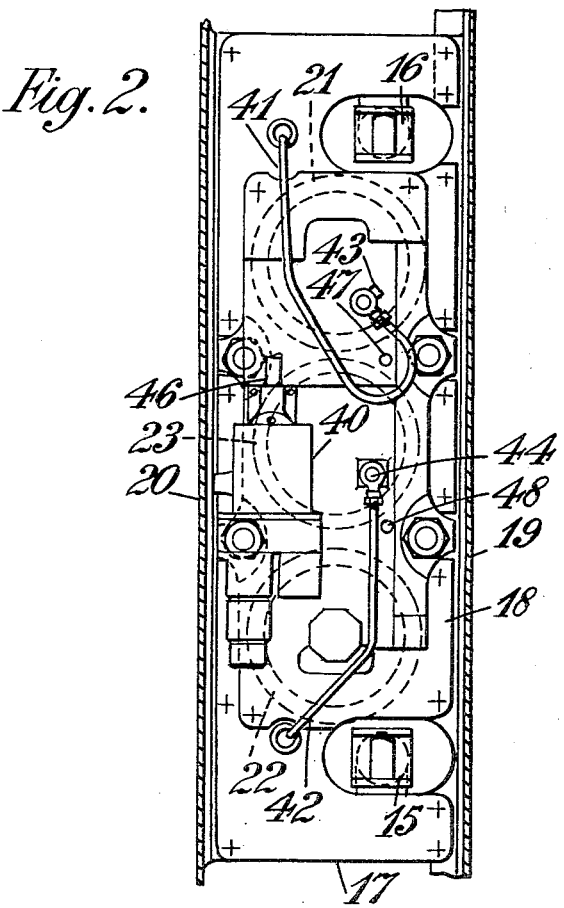
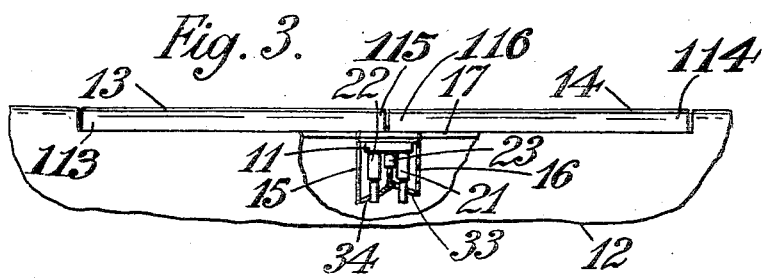
INVENTOR
Hugh G. Conway
By Watson, Cole, Grindle & Watson
ATTORNEYS United States Patent Office 2,799,992
Patented July 23, 1957

2,799,992
HYDRAULICALLY ACTUATED LINKAGES

Hugh Graham Conway, Gloucester, England, assignor to British Messier Limited, Gloucester, England, a British company Application October 20, 1953, Serial No. 387,272

Claims priority, application Great Britain October 29, 1952

8 Claims. (Cl. 60—51)

This invention comprises improvements in or relating to hydraulic actuators.

It is an object of the invention to provide an actuator which is capable of exerting force on more than one operated elements at one time, by means of a single jack element in which the various forces and reactions are as far as possible borne by self-contained parts of the actuator. It is a further object of the invention to provide an actuator in which lateral stresses on the jack rod are avoided without the employment of any cross head and slide mechanisms, because such mechanisms are liable to be weighty and to introduce undue frictional losses.

According to the present invention a hydraulic actuator comprises a base, a jack secured thereto, bracket means supported from the base for carrying a parallel motion, means connecting the moving element of the jack to the part of the parallel motion which executes a straight line movement, and transmitting means for the force to be exerted by the actuator, which transmitting means are operated by the members of the parallel motion. By having the jack connected to the parallel motion in the manner described lateral forces on the jack are obviated without using guides, and by having the parallel motion mounted on a bracket which is supported by the base the lateral and reaction forces are self-contained. If an actuator is mounted in an aircraft this is important because it means that a minimum of structural reinforcement is required in the aircraft structure itself.

In the specific form of actuator hereinafter described, the actuator is used for exerting a plurality of forces, each exerted through a different part of the parallel motion, and thus the motion serves also as a distributing mechanism for the forces.

Preferably, the parallel motion is a "Watt" motion and the transmitting members for the forces are connected to levers which form extensions of the swinging links of the motion.

The bracket means which are supported by the base and which carry the parallel motion may be formed by utilising hydraulic accumulators, required for actuating the jack, as part of the bracket structure. In a preferred construction, the base carries two parallel cylinders to constitute accumulator casings, which cylinders are spaced apart from one another and the jack cylinder is mounted on the base between them. The ends of the accumulator cylinder carry extensions which support pivots for swinging links of a "Watt" type parallel motion, and the two extensions on the accumulator cylinders are united by a tie-bar so as to render the structure more rigid.

The following is a description by way of example of one construction of hydraulic actuator in accordance with the invention:

In the accompanying drawing,

Figure 2 is an end view of the same as located in an aeroplane wing-spar, and

Figure 3 is a plan of a portion of a wing showing the actuator located therein and connected to two leading edge flaps.

Figure 1:
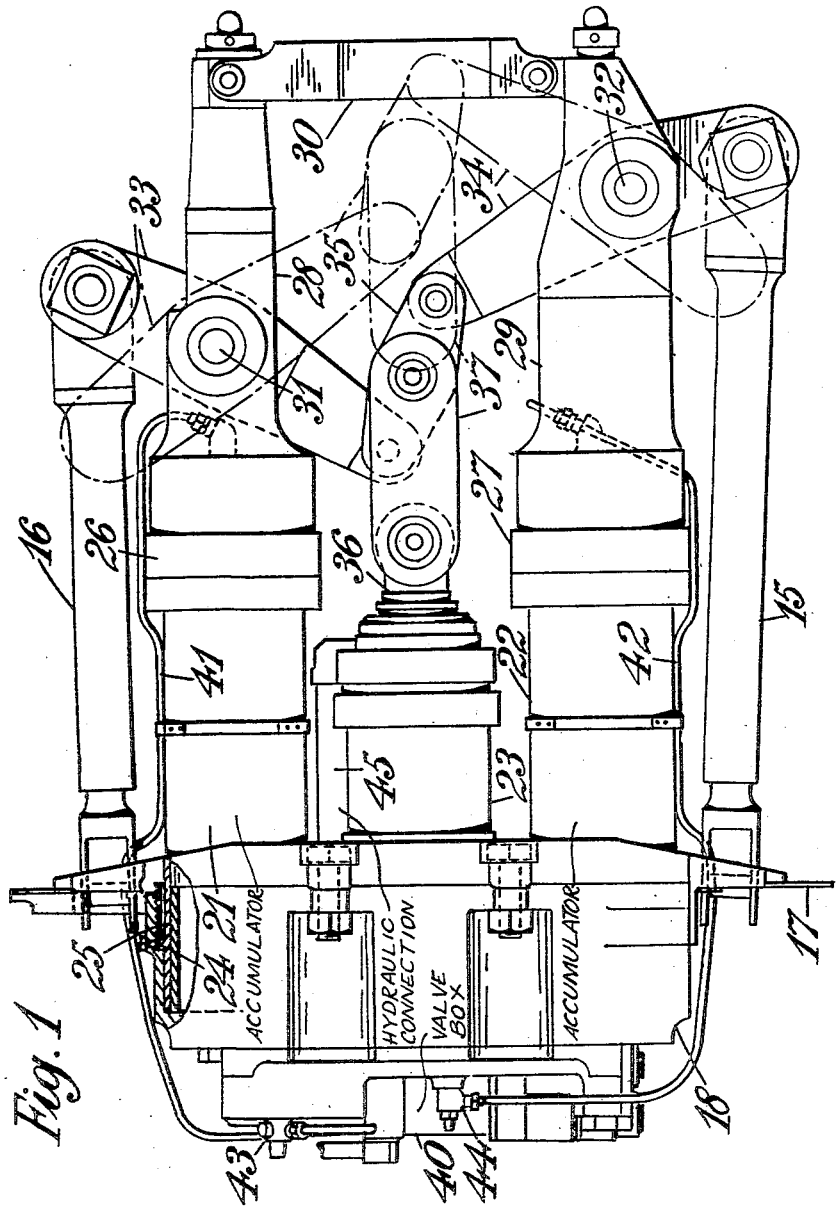
Figure 1 is a plan of the actuator.

The actuator 11 is intended to be located in a wing 12 of an aircraft near the centre of the leading edge to operate leading edge flaps 13, 14. The flaps 13, 14 extend along and form part of the leading edge and the actuator 11 is situated at the junction of the two flaps so as to operate a link-work by which the flaps are extended or retracted. The detail of the linkwork forms no part of the present invention, and is not shown in the drawing. It is sufficient to explain that the actuator operates two push-rods 15, 16, which operate one on each of the adjacent ends of the flaps 13 and 14, and that by means of linkwork, which extends along the wing within the flaps, the outer ends 113, 114 of the flaps are caused to move forward or backward parallel to the inner ends 115, 116 according to the direction in which force is exerted on the rods 15 and 16.

In the wing behind the flaps is an upright web 17, forming part of the wing structure, which extends parallel with the flaps, and into this web there is fitted a large base block 18 of forged light-metal alloy. The upper and lower surfaces of the wing structure are indicated in Figure 2 at 19 and 20 respectively.

The base block 18 is machined to receive the ends of two accumulator cylinders 21, 22, which extend from the base block parallel with one another into the hollow wing behind the vertical web 17, in a more or less horizontal direction. Between the accumulator cylinders a jack cylinder 23 is let into the base block and extends parallel with them, in the same plane. As can be seen in Figure 1, the cylinder 21 carries a flange 24, on which bears a sleeve 25, screwed into the bracket 18, and surrounding the cylinder 21 behind the flange 24. In this way the cylinder is held firmly in the block. The cylinder 22 and jack 23 are similarly secured.

The rear (outer) ends of the accumulator cylinders 21, 22 are closed by caps 26, 27, united to bracket elements 28, 29 which form extensions of the cylinders and the ends of which are united together by a cross bar 30.

Each of the bracket elements 28, 29 contains a pivot (31, 32), for a swinging lever (33, 34), and the two swinging levers are united by a link 35 so as to form a "Watt" type parallel motion, the centre of the link moving in a straight line.

The jack cylinder 23 contains a piston and ram 36, and the end of the ram 36 extends through a stuffing box toward the link 35 of the parallel motion. The end of the ram is linked to the straight line point of the parallel motion by two link members 37, one in front and one behind the link 35 of the parallel motion. The link of the parallel motion itself is forked to receive the ends of the two levers 33, 34, which are pivoted on the bracket extensions 28, 29 from the accumulator cylinders.

The swinging levers 33, 34 project beyond their pivots on each side of the extensions and are connected by pin joints to the actuator rods 15, 16 already referred to, which extend from them parallel with the accumulator cylinders in a forward direction, passing through the vertical web 17 in the wing to which the base 18 of the actuator is attached and being connected in front of this web to the linkwork which operates the flaps 13, 14.

On the front face of the base 18, that is to say the opposite face from that on which the accumulaors and jack cylinder project, there is secured a valve box 40, which contains passages for the flow of the hydraulic operating fluid and valves to determine the operation of the accumulators 21, 22, and the jack 23. The internal construction of the valve box forms no part of the present invention. The outer ends of the accumulators 21, 22, are connected by air-pipes 41, 42 to inflation connections 43, 44, secured to the block 18. The jack 23 has a hydraulic connection 45, which extends from the block 18 to the end of the jack nearest to the linkwork, and the valves in the valve-box 40 can direct either hydraulic pressure or accumulator pressure to either end of the jack 23, which is double-acting. 46 is a connection to tank, and the supply connections are made to entrance ports 47, 48 in the block 11. Internal passages are drilled in the block 18 between the various parts as required.

It will be seen that in a construction of hydraulic actuator as just described, the two actuating rods 15, 16, are both operated simultaneously by a single jack element 36, and that with exception of the forces exerted by these rods, all the forces and reactions are self-contained within the actuator. Therefore, the minimum of stress is exerted on the wing structure itself. The accumulator cylinders 21, 22 which take the tensional reaction stress when the jack is extended, are in line with the reaction which they are resisting, and as the longitudinal stress in the accumulator cylinders due to the internal pressure thereof, is only one half the circumferential stress, they have an adequate strength to withstand this reaction, and the weight of separate bracket means is saved. The straight line movement of the parallel motion need not be more than a few thousandths of an inch out of true from the geometrically straight line, and therefore, the link members which connect this point to the jack ram do not exert any appreciable lateral force on the ram and the weight and friction of a sliding guide and cross head, which would otherwise be required, is obviated.

Moreover, if for any reason it is necessary to arrange for one of the flap actuating rods 15 or 16, to have a greater movement than the other, this can be easily arranged by varying the proportions of the links of the "Watt" motion, without necessitating alteration in the design of other parts of the unit.

In fact it will be seen that in the drawing the link 33 is longer from its pivot point on the bracket 28 to its pivot point on the rod 16, than the corresponding portion of the link 34, and the rod 16 will therefore, have a greater movement than the rod 15.

I claim:

1. A hydraulic actuator, especially for aircraft, to exert force on two independently-movable operated elements at one time, comprising a base, a fluid-operated jack having a fixed element secured to the base and a moving element to execute a straight line motion with respect thereto, bracket means supported from the base on either side of the jack, two swinging links pivoted on the bracket means at equal distances from the jack axis on opposite sides thereof and having portions of equal length extending inwardly toward the jack axis, a connecting link having one of its ends pivoted to the inner end of one of the swinging links and the other end pivoted to the inner end of the other swinging link, which connecting link is itself pivotally mounted, at a point intermediate said end pivots, on the moving element of the jack, all the aforementioned pivots having their axes parallel to one another and at right angles to the line of motion of said moving element, and the connecting link being oblique to said line, and members for moving the two operated elements pivotally connected to the swinging links at points spaced from pivots of the links on the bracket means.

2. A hydraulic actuator, especially for aircraft, to exert force on two independently-movable operated elements at one time, comprising a base, a fluid-operated jack having a fixed element secured to the base and a moving element to execute a straight line motion with respect thereto, bracket means supported from the base on either side of the jack, two swinging links pivoted on the bracket means at equal distances from the jack axis on opposite sides thereof, said swinging links having portions of equal length extending inwardly toward the jack axis and extensions outwardly of their pivots on the bracket means, a connecting link having one of its ends pivoted to the inner end of one of the swinging links and the other end pivoted to the inner end of the other swinging link, which connecting link is itself pivotally mounted, at a point intermediate said end pivots, on the moving element of the jack, all the aforementioned pivots having their axes parallel to one another and at right angles to the line of motion of said moving element, and the connecting link being oblique to said line, and rod members for moving the two operated elements disposed outside the bracket means on both sides of the actuator and substantially parallel to the line of motion of the moving jack element, the ends of said rod members being pivoted to the outer ends of the swinging link extensions and the rod members extending from the pivots toward the base of the actuator.

3. A hydraulic actuator as claimed in claim 1, wherein the bracket means which are supported from the base, and on which are pivoted the swinging links, are formed by utilizing hydraulic accumulators, required for actuating the jack, as part of the bracket structure.

4. A hydraulic actuator as claimed in claim 1, wherein the base carries two parallel cylinders constituting accumulator casings, which cylinders are spaced apart from one another, and the jack cylinder is mounted on the base between them.

5. A hydraulic actuator as claimed in claim 4, wherein extensions on the ends of the accumulator cylinders remote from the base support the pivots for the swinging links, and a tie bar unites the ends of the two extensions on the accumulator cylinders so as to render the structure more rigid.

6. A hydraulic actuator as claimed in claim 1, wherein the moving element of the jack has a point of articulation between the fixed element of the jack and the pivot on said moving element for the connecting link.

7. A hydraulic actuator, especially for aircraft, to exert force on two independently-movable operated elements at one time, comprising a base, a fluid-operated jack having a fixed element secured to the base and a moving element to execute a straight line motion with respect thereto, bracket means supported from the base on either side of the jack, two swinging links pivoted on the bracket means at equal distances from the jack axis on opposite sides thereof, said swinging links having portions of equal length extending inwardly toward the jack axis and extensions outwardly of their pivots on the bracket means, a connecting link having one of its ends pivoted to the inner end of one of the swinging links and the other end pivoted to the inner end of the other swinging link, which connecting link is itself pivotally mounted, at a point intermediate said end pivots, on the moving element of the jack, all the aforementioned pivots having their axes parallel to one another and at right angles to the line of motion of said moving element, and the connecting link being oblique to said line, and actuating members connected to the two operated elements disposed outside the bracket means on both sides of the actuator and pivotally connected to said extensions.

8. A hydraulic actuator as claimed in claim 7, wherein on one swinging link extension the distance between the pivot of the link on the bracket means and the pivotal connection of one actuating member is greater than the equivalent distance on the other swinging link extension, whereby one operated element moves by greater amounts than the other.

References Cited in the file of this patent

UNITED STATES PATENTS

| 1,332,340 | Horne | Mar. 2, 1920 |
| 2,595,248 | Greer et al. | May 6, 1952 |

OTHER REFERENCES

"Elements of Mechanism," by Schwamb, Merrill & James, 5th edition, published by John Wiley & Sons, Inc., New York, pages 123–125.